(12) United States Patent
Matsuyama et al.

(10) Patent No.: US 9,690,592 B2
(45) Date of Patent: Jun. 27, 2017

(54) DISPLAY CONTROL DEVICE, AND DISPLAY CONTROL METHOD

(71) Applicant: DENSO CORPORATION, Kariya, Aichi-pref. (JP)

(72) Inventors: Shigeo Matsuyama, Obu (JP); Hiroshi Ishiguro, Anjo (JP); Kiyohiko Sawada, Nagoya (JP)

(73) Assignee: DENSO CORPORATION, Kariya, Aichi-pref (JP)

( * ) Notice: Subject to any disclaimer, the term of this patent is extended or adjusted under 35 U.S.C. 154(b) by 0 days.

(21) Appl. No.: 14/889,294

(22) PCT Filed: May 12, 2014

(86) PCT No.: PCT/JP2014/002481
§ 371 (c)(1),
(2) Date: Nov. 5, 2015

(87) PCT Pub. No.: WO2014/185044
PCT Pub. Date: Nov. 20, 2014

(65) Prior Publication Data
US 2016/0103687 A1 Apr. 14, 2016

(30) Foreign Application Priority Data

May 14, 2013 (JP) ................................ 2013-102312

(51) Int. Cl.
*G06F 9/46* (2006.01)
*G06F 9/44* (2006.01)
(Continued)

(52) U.S. Cl.
CPC .............. *G06F 9/44* (2013.01); *G06F 3/0482* (2013.01); *G06F 9/445* (2013.01); *G06F 9/4443* (2013.01); *G06F 9/54* (2013.01)

(58) Field of Classification Search
None
See application file for complete search history.

(56) References Cited

U.S. PATENT DOCUMENTS 6,374,353 B1 4/2002 Settsu et al.
2010/0238008 A1 9/2010 Hamachi et al.
(Continued)

FOREIGN PATENT DOCUMENTS

EP       1607850 A2    12/2005
JP      2006150999 A    6/2006
(Continued)

OTHER PUBLICATIONS

International Search Report and Written Opinion (in Japanese with English Translation) for PCT/JP2014/002481, mailed Jul. 1, 2014; ISA/JP.

(Continued)

*Primary Examiner* — Sisley Kim
(74) *Attorney, Agent, or Firm* — Harness, Dickey & Pierce, P.L.C.

(57) ABSTRACT

A display control device for controlling a display unit in a vehicle, including a dedicated middleware that executes a dedicated application program on a vehicle side, a general purpose middleware that executes a general purpose application program from an external of the vehicle, and an interface that exchanges necessary information between the dedicate middleware and the general purpose middleware, includes: an activation device that activates the dedicated middleware first, and activates the general purpose middleware after the dedicated middleware; and a dedicated display control device that displays, before an activation of the general-purpose middleware is completed, a dedicated menu screen for activating the dedicated application program on the display unit via the dedicated middleware when the (Continued)

dedicated application program on the dedicated middleware is available.

8 Claims, 6 Drawing Sheets

(51) Int. Cl.
  *G06F 9/445* (2006.01)
  *G06F 3/0482* (2013.01)
  *G06F 9/54* (2006.01)

(56) References Cited

U.S. PATENT DOCUMENTS

| 2011/0107349 | A1* | 5/2011 | Kishita | G06F 9/44 |
| | | | | 719/313 |
| 2013/0145360 | A1* | 6/2013 | Ricci | G06F 9/54 |
| | | | | 717/174 |
| 2015/0133164 | A1* | 5/2015 | Song | G06Q 10/10 |
| | | | | 455/456.3 |

FOREIGN PATENT DOCUMENTS

| JP | 2008098733 A | 4/2008 |
| JP | 2011209863 A | 10/2011 |
| JP | 2012090088 A | 5/2012 |
| JP | 2012099924 A | 5/2012 |
| JP | 2012244430 A | 12/2012 |
| WO | WO-2009060660 A1 | 5/2009 |

OTHER PUBLICATIONS

U.S. Appl. No. 14/889,292, filed Nov. 5, 2015, Maeda et al.

* cited by examiner

DISPLAY CONTROL DEVICE, AND DISPLAY CONTROL METHOD

CROSS REFERENCE TO RELATED APPLICATIONS

This application is a U.S. National Phase Application under 35 U.S.C. 371 of International Application No. PCT/JP2014/002481 filed on May 12, 2014 and published in Japanese as WO 2014/185044 A1 on Nov. 20, 2014. This application is based on and claims the benefit of priority from Japanese Patent Application No. 2013-102312 filed on May 14, 2013. The entire disclosures of all of the above applications are incorporated herein by reference.

TECHNICAL FIELD

The present disclosure relates to a display control device and a display control method to control a display on an in-vehicle display portion and to a program realizing the same.

BACKGROUND ART

In recent mobile terminals, such as smartphones and tablets, application programs (hereinafter, referred to as applications) are frequently released and become easy to add and delete by using a general-purpose operating system.

A high-end CPU is now used for mobile terminals and multi-tasking enables an execution by switching multiple application screens. Under such circumstances, a mobile terminal capable of letting a user know an active application is proposed in the related art (see, for example, Patent Literature 1).

Applications (hereinafter, referred to as the general-purpose applications) running on the mobile terminal are reset (dropped) or hang up (the screen is locked) during operation, which raises a stability concern.

Hence, in a case where a general-purpose application is run on an in-vehicle device, stability of the in-vehicle device may possibly be deteriorated when the general-purpose application is used for control at the vehicle end. Even when the stability is ensured at the time of shipment, stability of the entire in-vehicle device may possibly be deteriorated by a general-purpose application downloaded and added after the shipment.

Such inconveniences may be eliminated by installing vehicle cooperative applications used to control the vehicle and the general-purpose applications as above separately in the in-vehicle device. By installing the applications separately as above, rich general-purpose applications become available in the vehicle while minimizing influences on the vehicle cooperative applications.

However, because it becomes necessary to start rich general-purpose applications in addition to the vehicle cooperative applications, it may take longer to start an application. For example, when a display of a menu screen on a display portion is slow, a concern is raised about an inconvenience that the user cannot use the application until the menu screen is displayed.

PRIOR ART LITERATURES

Patent Litrature
    Patent Literature 1: JP-2012-99924 A

SUMMARY OF INVENTION

It is an object of the present disclosure to provide a display control device capable of installing vehicle cooperative applications and general-purpose applications separately in a vehicle and also quickly displaying a menu screen on start-up, and a program realizing the display control device.

According to a first aspect of the present disclosure, a display control device for controlling a display of a display unit mounted in a vehicle, including a dedicated middleware that executes a dedicated application program prepared on a vehicle side, a general purpose middleware that executes a general purpose application program delivered from an external of the vehicle, and an interface that exchanges necessary information between the dedicate middleware and the general purpose middleware, includes: an activation device that activates the dedicated middleware first on start-up, and activates the general purpose middleware after the dedicated middleware is activated; and a dedicated display control device that displays, before an activation of the general-purpose middleware is completed by the activation device, a dedicated menu screen for activating the dedicated application program on the display unit via the dedicated middleware when the dedicated application program on the dedicated middleware is available.

When configured as above, not only the dedicated middleware but also the general-purpose middleware that executes the general-purpose application distributed from the outside source is installed to the display control device. Hence, different from the related art, a general-purpose application that is frequently released and easy to add and delete becomes available without having to connect a mobile terminal. In addition, because the I/F is interposed between the dedicated and general-purpose middleware, a trouble in data communications caused by a disturbance or the like does not occur. Further, by interposing the I/F, only necessary information can be exchanged, which is advantageous also in terms of security.

Also, in view of an inconvenience that the dedicated application is not immediately available due to waiting for an activation of the general-purpose middleware, the dedicated menu screen used to start the dedicated application is displayed via the dedicated middleware before an activation of the general-purpose middleware is completed. When configured as above, a vehicle cooperative application and the general-purpose application can be separately installed to the vehicle, and more importantly, the menu screen can be quickly displayed on start-up.

According to a second aspect of the present disclosure, a program provides to function a computer as each device in the display control device according to the first aspect.

According to the program, a general-purpose application that is frequently released and easy to add and delete becomes available without having to connect a mobile terminal. In addition, because the I/F is interposed between the dedicated and general-purpose middleware, a trouble in data communications caused by a disturbance or the like does not occur. Further, by interposing the I/F, only necessary information can be exchanged, which is advantageous also in terms of security. Furthermore, a vehicle cooperative application and the general-purpose application can be separately installed to the vehicle, and more importantly, the menu screen can be quickly displayed on start-up.

According to a third aspect of the present disclosure, a display control method for controlling a display of a display unit mounted on a vehicle, includes: activating a dedicated middleware that executes a dedicated application program prepared on a vehicle side first on start-up; activating a general-purpose middleware that executes a general-purpose application program delivered from an external of the vehicle after the dedicated middleware is activated; displaying, before an activation of the general-purpose middleware is completed, a dedicated menu screen for activating the dedicated application program on the display unit via the dedicated middleware when the dedicated application program on the dedicated middleware is available; and exchanging necessary information between the dedicated middleware and the general-purpose middleware through an interface.

According to the display control method configured as above, a general-purpose application that is frequently released and easy to add and delete becomes available without having to connect a mobile terminal. In addition, because the I/F is interposed between the dedicated and general-purpose middleware, a trouble in data communications caused by a disturbance or the like does not occur. Further, by interposing the I/F, only necessary information can be exchanged, which is advantageous also in terms of security. Furthermore, a vehicle cooperative application and the general-purpose application can be separately installed to the vehicle, and more importantly, the menu screen can be quickly displayed on start-up.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Hereinafter, one embodiment of the present disclosure will be described according to the drawings.

Figure 1:
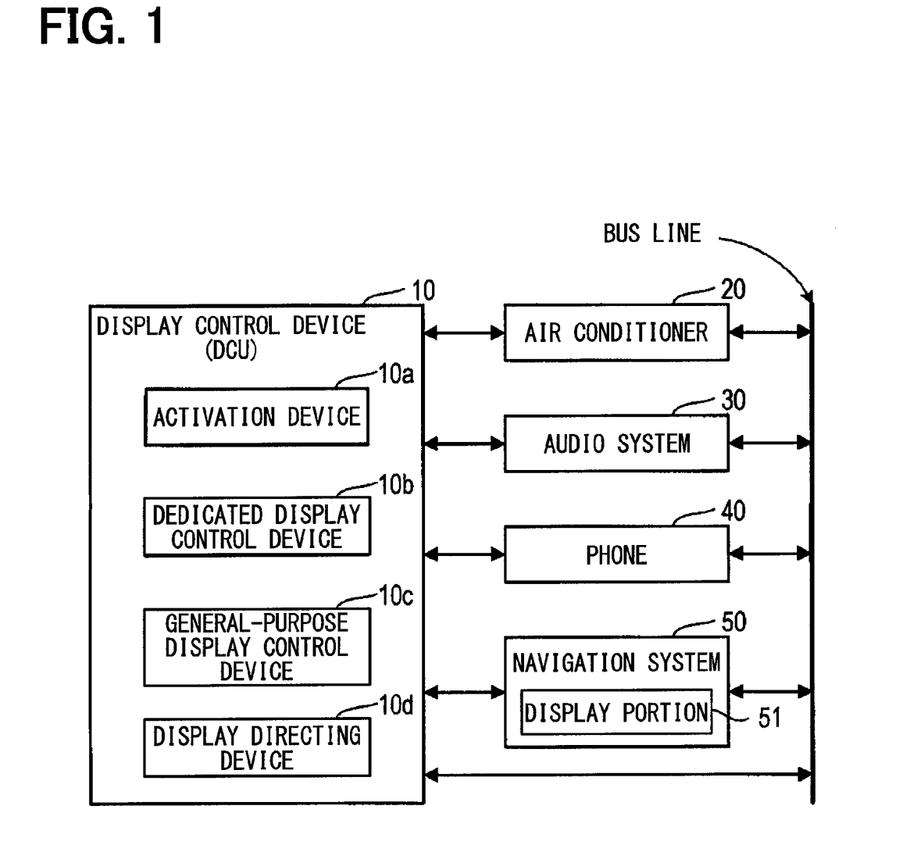
FIG. 1 is a block diagram showing an example of a peripheral configuration including a display control device.

As is shown in FIG. 1, a display control device (DCU) 10 of the present embodiment is a domain control unit in which hardware and software are integrated, and connected to an air conditioner 20, an audio system 30, a phone 40, and a navigation system 50. The air conditioner 20, the audio system 30, the phone 40, and the navigation system 50 are connected to a bus line and therefore capable of receiving information on the bus line. The audio system 30 is capable of outputting a sound via an unillustrated speaker. The navigation system 50 has a display portion 51 formed of a color liquid crystal display or the like.

Owing to the configuration as above, the display control device 10 is capable of controlling the display portion 51 of the navigation system 50 to display an air conditioner setting screen, an audio system setting screen, a phone operation screen, navigation maps, and so on. In the case of the air conditioner setting screen, for example, the display control device 10 sets a room temperature according to an input from a touch panel provided integrally with the display portion 51 and outputs an outside air temperature to the air conditioner 20 on the basis of an unillustrated outside air temperature sensor.

Figure 2:
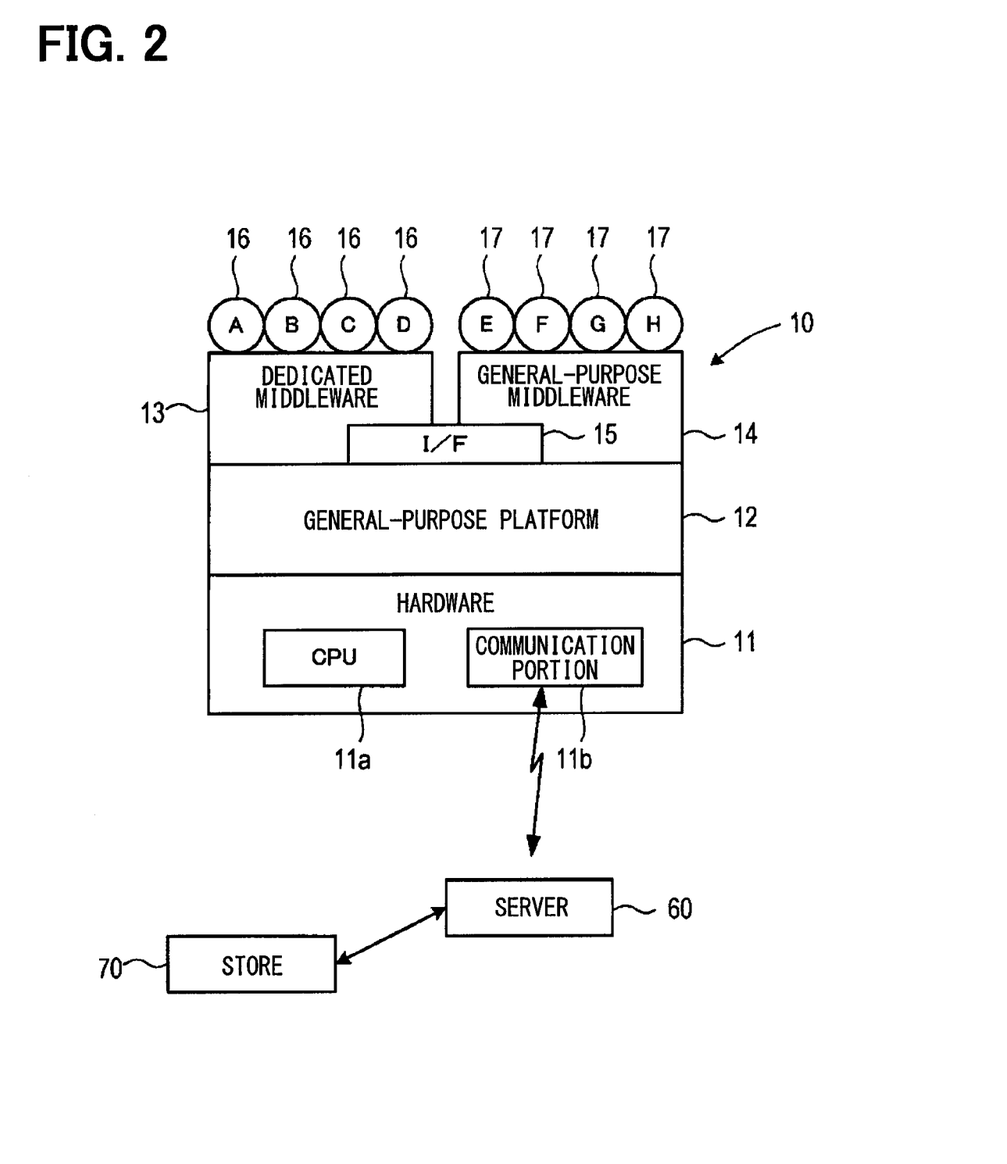
FIG. 2 is a view used to describe an example of hardware and software configurations inside the display control device.

As is shown in FIG. 2, the display control device 10 includes hardware 11, a general-purpose platform 12, dedicated middleware 13, general-purpose middleware 14, an I/F 15, dedicated applications 16 run on the dedicated middleware 13, and general-purpose applications 17 run on the general-purpose middleware 14.

The hardware 11 includes a CPU 11a and a communication portion 11b. The CPU 11a is a control portion that controls the general-purpose platform 12, the dedicated middleware 13, the general-purpose middleware 14, the I/F 15, and the applications 16 and 17 to function. The communication portion 11b is configured so as to enable data communications with a server 60, and is capable of downloading the general-purpose applications 17 via a network from a store 70 from which applications are supplied. The general-purpose applications 17 per se are also capable of making data communications with the server 60 via the network.

The general-purpose platform 12 is so-called a platform at a higher level than the hardware 11. The dedicated middleware 13 and the general-purpose middleware 14 run on the general-purpose platform 12. It is the I/F 15 that exchanges data between the dedicated middleware 13 and the general-purpose middleware 14. The I/F 15 is configured to be capable of exchanging only necessary information.

Hereinafter, the dedicated applications 16 are distinguished from one another by attaching capitals A, B, C, and D to the dedicated applications 16. For example, the dedicated application 16A is an air conditioner application, the dedicated application 16B is an audio system application, the dedicated application 16C is a phone application, and the dedicated application 16D is a navigation system application.

The general-purpose applications 17 are also distinguished from one another by attaching capitals E, F, G, and H to the general-purpose applications 17. For example, the general-purpose application 17E is a social network application, the general-purpose application 17F is a communication application, the general-purpose application 17G is a WEB search application, and the general-purpose application 17H is a net radio application.

Figure 3:
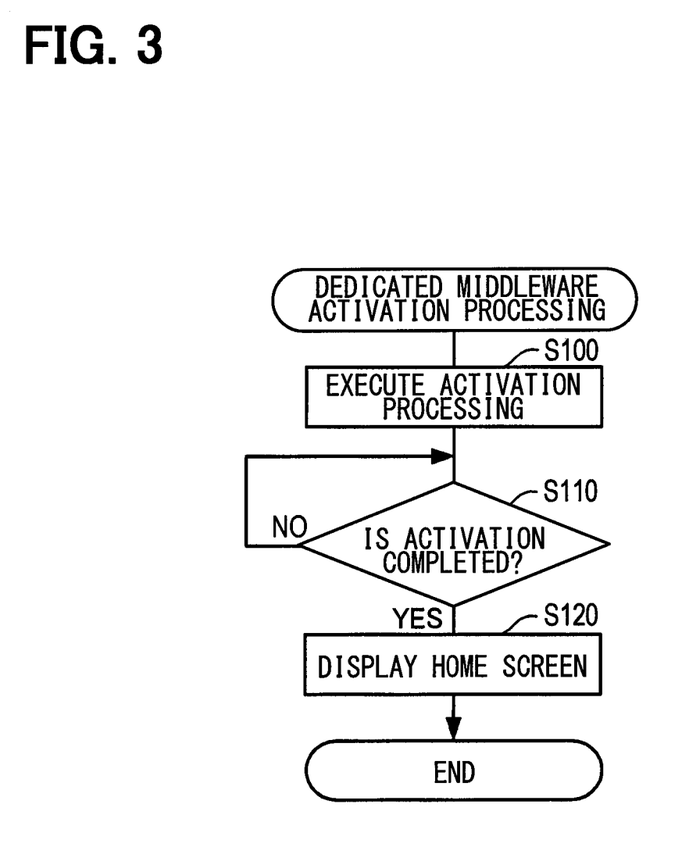
FIG. 3 is a flowchart depicting an example of dedicated middleware activation processing.

Dedicated middleware activation processing will now be described according to the flowchart of FIG. 3. The dedicated middleware activation processing is performed when a vehicle ignition switch is turned ON.

Activation processing is performed first in S100. The activation processing is to activate the dedicated middleware 13.

A determination is made in subsequent S110 as to whether the activation is completed. The activation is completed when a screen display by the dedicated middleware 13 is enabled and the dedicated applications 16 are ready to start. When it is determined that the activation is completed (S110: YES), advancement is made to S120. On the other hand, the determination processing in S110 is repeated (S110: NO) until the activation is completed.

Figure 6A:
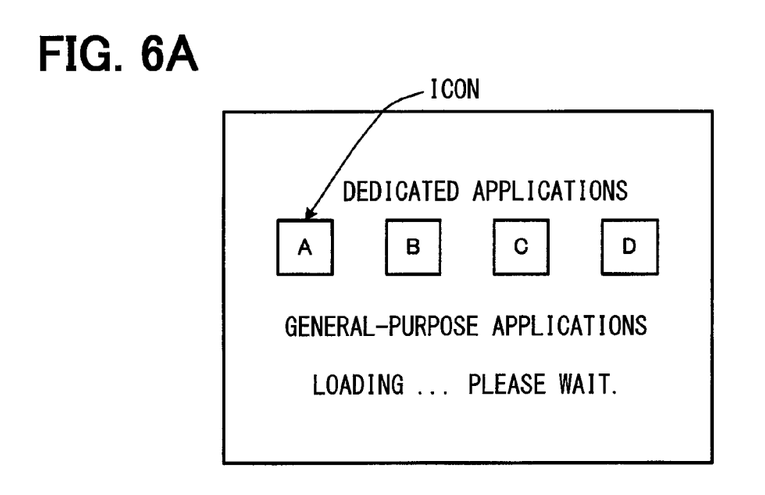
FIGS. 6A through 6C are views used to describe examples of a display on a display portion.

A home screen is displayed in S120. The home screen display processing is to display a menu listing the dedicated applications 16. More specifically, as is shown in FIG. 6A, icons of the dedicated applications 16A through 16D are displayed on the display portion 51. The user is thus enabled to start the dedicated applications 16A through 16D by touching the corresponding icons. Herein, because an activation of the general-purpose middleware 14 is not completed, a message, "LOADING . . . PLEASE WAIT", is displayed for the general-purpose applications 17.

General-purpose middleware activation processing will now be described according to the flowchart of FIG. 4. The general-purpose middleware activation processing is performed following the dedicated middleware activation processing of FIG. 3.

The activation processing is performed in S200. The activation processing is to activate the general-purpose middleware 14.

A determination is made in subsequent S210 as to whether the activation is completed. The activation is completed when a screen display by the general-purpose middleware 14 is enabled and the general-purpose applications 17 are ready to start. When it is determined that the activation is completed (S210: YES), advancement is made to S220. On the other hand, the determination processing in S210 is repeated (S210: NO) until the activation is completed.

A completion of the activation of the general-purpose middleware 14 is notified in S220. The completion notification processing is to notify the dedicated middleware 13 of a completion of the activation of the general-purpose middleware 14 via the I/F 15. In response to the notification, the dedicated middleware 13 directs a screen display as will be described below.

Accordingly, a determination is made in S230 as to whether a display is directed from the dedicated middleware 13. When it is determined that a display is directed (S230: YES), advancement is made to S240. On the other hand, when a display is not directed (S230: NO), the determination processing in S230 is repeated.

Figure 6B:
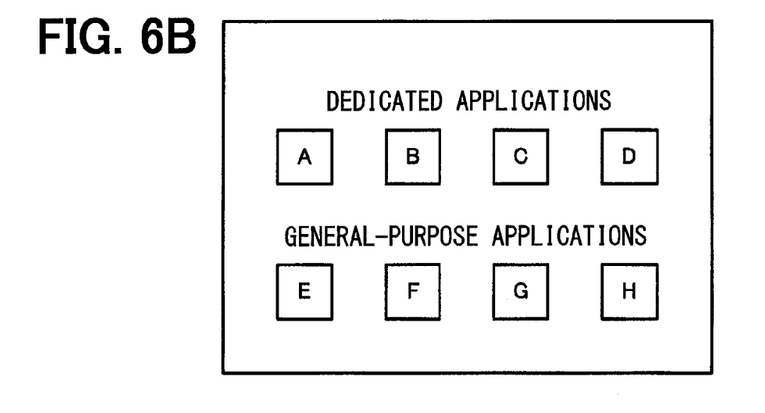

The home screen is displayed in S240. The home screen display processing is to display a menu listing the dedicated applications 16 and the general-purpose applications 17 via the general-purpose middleware 14. More specifically, as is shown in FIG. 6B, icons of the dedicated applications 16A through 16D are displayed on the display portion 51. Also, icons of the general-purpose applications 17E through 17H are displayed in a row below the icons of the dedicated applications 16. The user is thus enabled to start the dedicated applications 16A through 16D and the general-purpose applications 17E through 17H by touching the corresponding icons.

The screen display is notified in subsequent S250. The screen display notification process is to notify the dedicated middleware 13 of a completion of the screen display via the I/F 15.

Figure 5:
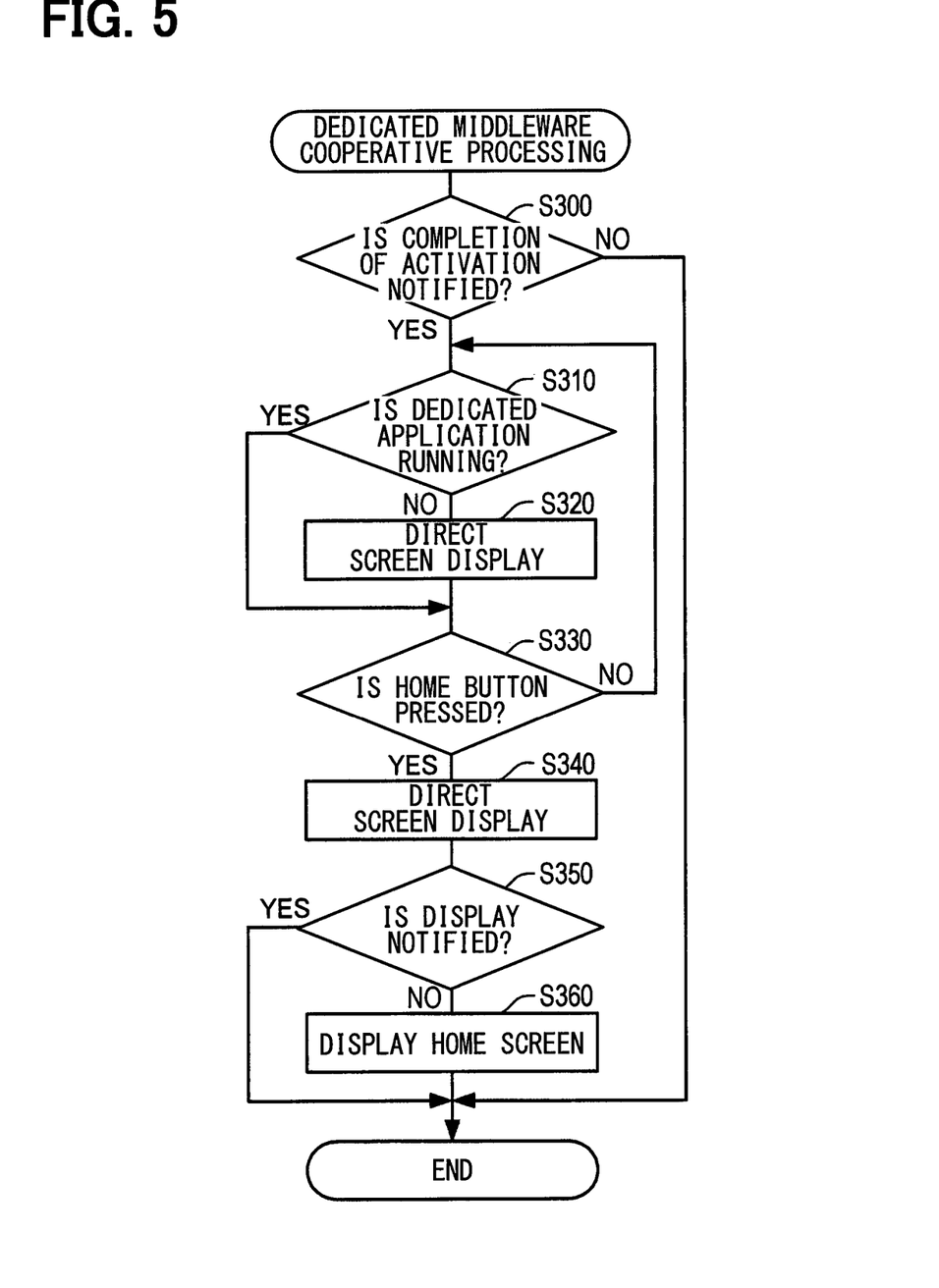
FIG. 5 is a flowchart depicting an example of dedicated middleware notification processing.

Dedicated middleware cooperative processing will now be described according to the flowchart of FIG. 5. The dedicated middleware cooperative processing is performed repetitively following the dedicated middleware activation processing of FIG. 3.

In S300, a determination is made as to whether a completion of the activation is notified. The notification determination processing corresponds to S220 of FIG. 4. Herein, a determination of YES is made when a completion of the activation of the general-purpose middleware 14 is notified. When it is determined that a completion of the activation is notified (S300: YES), advancement is made to S310. On the other hand, when it is determined that a completion of the activation is not notified (S300: NO), the dedicated middleware cooperative processing is ended without performing processing in subsequent steps.

A determination is made in S310 as to whether any of the dedicated applications 16 is running. For example, in a case where the dedicated application 16C is a phone application, a determination of YES is made when the user is using the phone and the phone application is running. When it is determined that the dedicated application 16 is running (S310: YES), advancement is made to S330. On the other hand, when it is determined that none of the dedicated applications 16 is running (S310: NO), a screen display is directed to the general-purpose middleware 14 via the I/F 15 in S320, after which advancement is made to S330. A determination of YES is made in S230 of FIG. 4 on the basis of the screen display directed herein.

In S330, a determination is made as to whether a home button is depressed. The button depression determination processing is to determine whether the user has depressed the home button which is depressed to end the currently running dedicated application 16. When it is determined that the user has depressed the home button (S330: YES), a screen display is directed to the general-purpose middleware 14 via the I/F 15 in S340, after which advancement is made to S350. A determination of YES is made in S230 of FIG. 4 on the basis of the screen display directed herein. On the other hand, when it is determined that the user has not depressed the home button (S330: NO), the processing is repeated from S310.

Figure 6C:
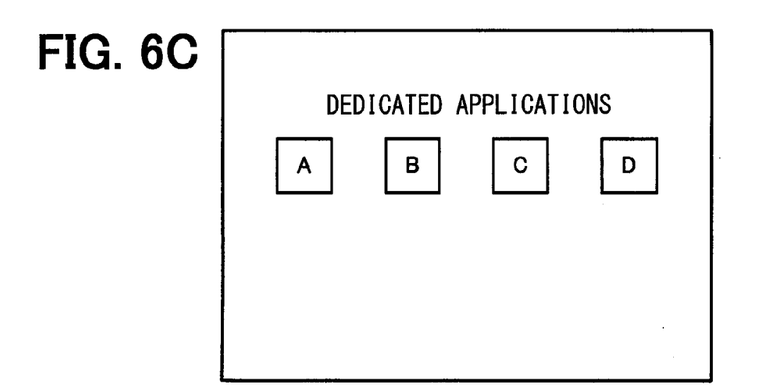

In S350, a determination is made as to whether the display is notified. The display notification determination processing corresponds to S250 of FIG. 4 and a determination of YES is made when the screen display is notified from the general-purpose middleware 14. When it is determined that the display is notified (S350: YES), that is, when the screen is displayed normally by the general-purpose middleware 14, the dedicated middleware cooperative processing is ended without performing processing in S360. On the other hand, when it is determined that the display is not notified (S350: NO), that is, in the event of a trouble of some sort in the general-purpose middleware 14, the home screen is displayed at the end of the dedicated middleware 13 in S360, after which the dedicated middleware cooperative processing is ended. In S360, for example, the icons of the dedicated applications 16 alone are displayed as is shown in FIG. 6C.

As has been described in detail above, the display control device 10 of the present embodiment includes the dedicated middleware 13, the general-purpose middleware 14, and the I/F 15, and controls a display on the display portion 51 of the navigation system 50. During the control, the dedicated middleware 13 is capable of executing the dedicated applications 16 prepared at the vehicle end while the general-purpose middleware 14 is capable of executing the general-purpose applications 17 distributed from an outside source. Also, the I/F 15 exchanges necessary information between the dedicated middleware 13 and the general-purpose middleware 14.

When configured as above, not only the dedicated middleware 13, but also the general-purpose middleware 14 that executes the general-purpose applications 17 distributed from an outside source is installed to the display control device 10. Hence, different from the related art, the general-purpose applications 17 that are frequently released and easy to add and delete become available without having to connect a mobile terminal. In addition, because the I/F 15 is interposed between the dedicated and general-purpose middleware 13 and 14, a trouble in data transmission caused by a disturbance or the like does not occur. Further, by interposing the I/F 15, only the necessary information can be exchanged, which is advantageous also in terms of security.

In the dedicated middleware activation processing (see FIG. 3), in particular, the activation processing of the dedicated middleware 13 is performed (S100), and when the activation of the dedicated middleware 13 is completed (S110: YES), the home screen is displayed at the end of the dedicated middleware 13 (S120). The home screen is a menu screen (see FIG. 6A) enabling the user to use the dedicated applications 16.

In other words, the display control device 10 includes activation device 10a for activating the dedicated middleware 13 first on start-up and activating the general-purpose middleware 14 after the dedicated middleware 13, and dedicated display control device 10b for displaying, before the activation of the general-purpose middleware 14 by the activation device 10a is completed, a dedicated menu screen used to start the dedicated applications 16 on the display portion 51 via the dedicated middleware 13 when the dedicated applications 16 on the dedicated middleware 13 become available.

That is to say, in view of an inconvenience that the dedicated applications 16 are not immediately available due to waiting for an activation of the general-purpose middleware 14, the dedicated menu screen used to start the dedicated applications 16 is displayed via the dedicated middleware 13 before the activation of the general-purpose middleware 14 is completed. When configured as above, the vehicle cooperative applications and the general-purpose applications can be separately installed to the vehicle, and more importantly, the menu screen can be quickly displayed on start-up.

In the present embodiment, the activation processing of the general-purpose middleware 14 is performed (S200 of FIG. 4) following the activation processing of the dedicated middleware 13, and the home screen is drawn again via the general-purpose middleware 14 (S240) when the activation of the general-purpose middleware 14 is completed (S210: YES). The home screen is a menu screen to enable the user to use the dedicated applications 16 and the general-purpose applications 17 (see FIG. 6B). In other words, the display control device 10 further includes general-purpose display control device 10c for displaying a general-purpose menu screen used to start the dedicated applications 16 and the general-purpose applications 17 on the display portion 51 via the general-purpose middleware 14 after the activation of the general-purpose middleware 14 is completed. Owing to the configuration as above, the user can use the general-purpose applications 17 as soon as the general-purpose middleware 14 is activated.

Figure 4:
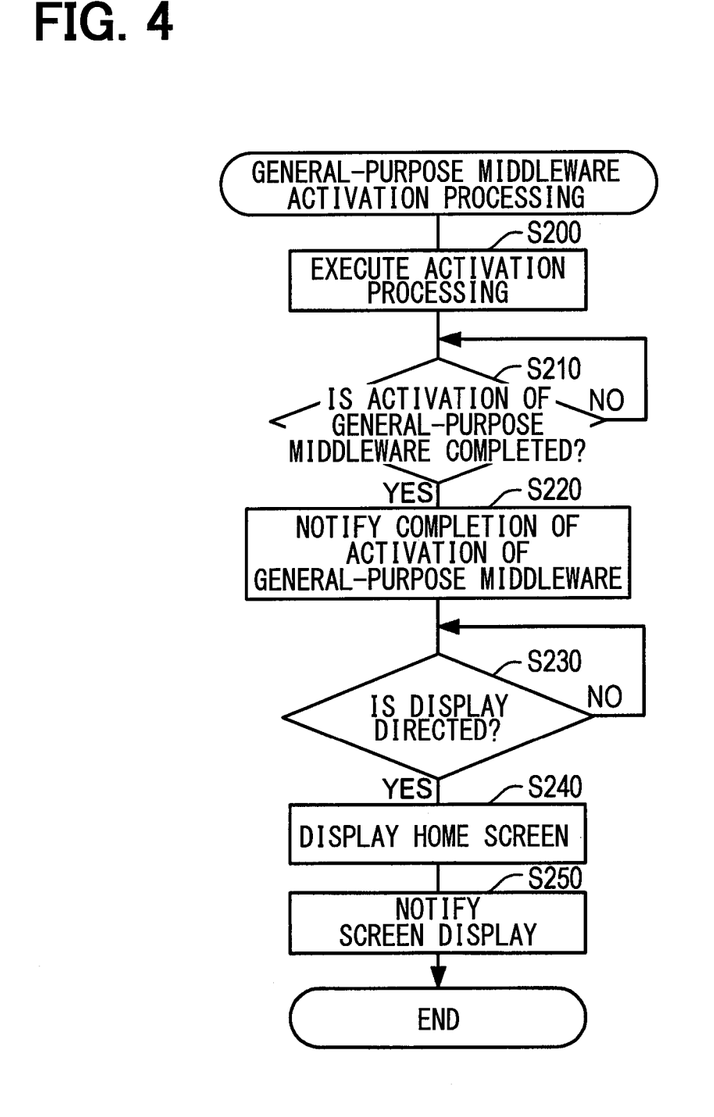
FIG. 4 is a flowchart depicting an example of general-purpose middleware activation processing.

In the present embodiment, when the activation of the general-purpose middleware 14 is completed (S210 of FIG. 4: YES), a completion of the activation of the general-purpose middleware 14 is notified to the dedicated middleware 13 (S220). When a display is directed from the dedicated middleware 13 in response to the notification (S230: YES), the home screen is displayed (S240). In other words, when the activation of the general-purpose middleware 14 is completed, the general-purpose display control device 10c notifies the dedicated middleware 13 of a completion of the activation, and when a display is directed from the dedicated middleware 13, the general-purpose display control device 10c displays the general-purpose menu screen on the display portion 51. Consequently, the general-purpose middleware 14 can cooperate with the dedicated middleware 13 and the home screen can be displayed at the end of the general-purpose middleware 14 at suitable timing.

More specifically, in the dedicated middleware cooperative processing (see FIG. 5), when a completion of the activation is notified from the general-purpose middleware 14 (S300: YES), a display of the home screen is directed when a predetermined condition is established (S320 and S340). In other words, the display control device 10 further includes display directing device 10d for directing a display of the general-purpose menu screen when a predetermined condition is established in response to the notification of a completion of the activation from the general-purpose middleware 14. Consequently, a direction of a display can be notified to the general-purpose middleware 14 at timing at the end of the dedicated middleware 13, and the home screen can be displayed at the end of the general-purpose middleware 14 at suitable timing.

For example, in the present embodiment, a screen display is directed (S320) when none of the dedicated applications 16 is running (S310: NO). Also, a screen display is directed (S340) when the home button to stop the dedicated application 16 from running is depressed (S330: YES). In other words, when none of the dedicated applications 16 is running or when the user directs to stop the dedicated application 16 from running, the display directing device 10d directs a display. Consequently, the home screen at the end of the general-purpose middleware 14 is not displayed while the dedicated application 16 is running and the home screen can be displayed at the end of the general-purpose middleware 14 at suitable timing.

Incidentally, an activation of the general-purpose middleware 14 may possibly fail due to a trouble of some sort. To address such an inconvenience, the present embodiment is configured as follows. That is, in the general-purpose middleware activation processing (see FIG. 4), after the home screen is displayed, the display is notified to the dedicated middleware 13 (S240 and S250). On the other hand, in the dedicated middleware cooperative processing (see FIG. 5), the home screen is displayed at the end of the dedicated middleware 13 (S360) when the display is not notified (S350: NO). In other words, the dedicated display control device 10b displays the dedicated menu screen on behalf of the general-purpose middleware 14 when the general-purpose middleware 14 fails to notify a completion of the display of the general-purpose menu screen. Consequently, even when an activation of the general-purpose middleware 14 fails due to a trouble of some sort, an appropriate menu can be displayed.

It should be appreciated that the present disclosure is not limited to the embodiment described above and can be implemented in various embodiments within the technical scope of the present disclosure.

It is noted that a flowchart or the processing of the flowchart in the present application includes sections (also referred to as steps), each of which is represented, for instance, as S100. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A display control device for controlling a display of a display unit mounted in a vehicle, the display control device comprising:

a dedicated middleware that executes a dedicated application program prepared on a vehicle side;

a general purpose middleware that executes a general purpose application program delivered from an external of the vehicle and that are frequently released and easy to add and delete become available without having to connect a mobile terminal; and an interface that exchanges necessary information between the dedicated middleware and the general purpose middleware;

a CPU that performs an activation of the dedicated middleware first on start-up, that performs an activation of the general purpose middleware after performing the activation of the dedicated middleware, and that displays on the display of the display unit, before an the activation of the general purpose middleware is completed by the CPU, a dedicated menu screen for activating the dedicated application program on the display unit via the dedicated middleware in response to the activation of the dedicated middleware being completed and the dedicated application program on the dedicated middleware being available by enabling a user to start the dedicated application program while displaying an incomplete message of the general-purpose middleware.

2. The display control device according to claim 1, wherein the CPU displays a general-purpose menu screen for activating the dedicated application program and the general purpose application program on the display unit via the general purpose middleware after the activation of the general purpose middleware is completed.

3. The display control device according to claim 2, wherein:

when the activation of the general purpose middleware is completed, the CPU notifies the dedicated middleware of a completion of the activation, and displays the general-purpose menu screen on the display unit when the display is directed from the dedicated middleware.

4. The display control device according to claim 3, wherein the CPU directs a display of the general-purpose menu screen when a predetermined condition is established in response to a notification of the completion of the activation from the general purpose middleware.

5. The display control device according to claim 4, wherein:

the CPU directs the display when the dedicated application program is not executed or when a user directs to stop executing the dedicated application program.

6. The display control device according to claim 1, wherein:

the CPU displays the dedicated menu screen on behalf of the general purpose middleware when the general purpose middleware does not notify a completion of the display of the general-purpose menu screen.

7. The display control device according to claim 3, wherein:

when the activation of the general purpose middleware is completed, the dedicated middleware is notified of the completion of the activation via the interface.

8. A display control method for controlling a display of a display unit mounted on a vehicle, comprising:

performing an activation of a general-purpose middleware that executes a dedicated application program prepared on a vehicle side first on start-up;

performing an activation of a general-purpose middleware that executes a general-purpose application program delivered from an external of the vehicle and that are frequently released and easy to add and delete become available without having to connect a mobile terminal after the activation of the dedicated middleware;

displaying, before the activation of the general-purpose middleware is completed, a dedicated menu screen for activating the dedicated application program on the display unit via the dedicated middleware in response to the activation of the dedicated middleware being completed and the dedicated application program on the dedicated middleware being available by enabling a user to start the dedicated application program while displaying an incomplete message of the general-purpose middleware; and exchanging necessary information between the dedicated middleware and the general-purpose middleware through an interface.

* * * * *